Aug. 23, 1949.  C. T. STORM ET AL  2,479,877
GARDEN CULTIVATING HAND RAKE
Filed Oct. 30, 1945
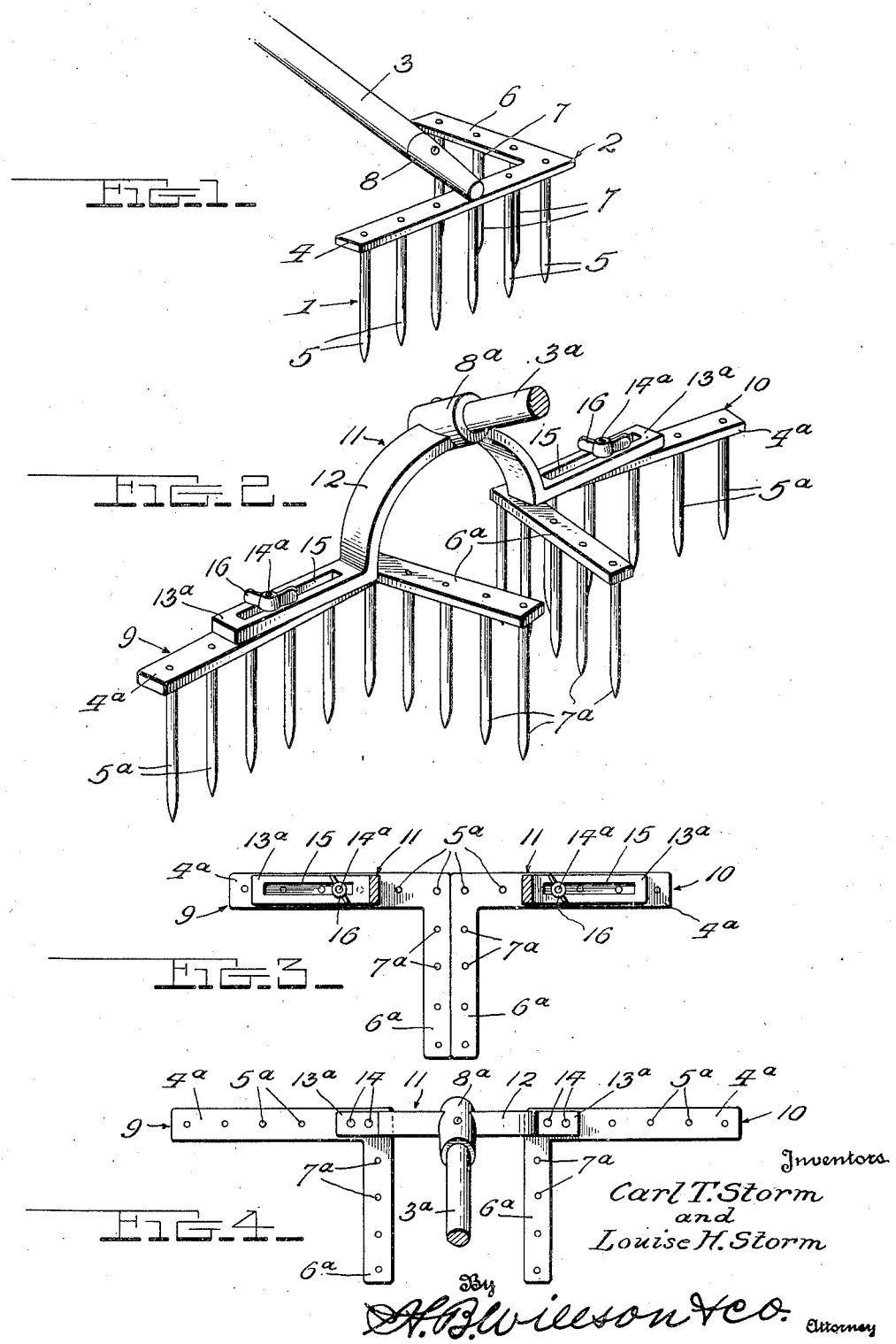

Patented Aug. 23, 1949

2,479,877

UNITED STATES PATENT OFFICE 2,479,877

GARDEN CULTIVATING HAND RAKE

Carl T. Storm and Louise H. Storm, Detroit, Mich.

Application October 30, 1945, Serial No. 625,506

2 Claims. (Cl. 97—71)

The invention relates to garden rakes of the hand cultivator type.

It is well known that the cultivation of small plants is tedious and that they are easily injured by clods, stones, etc. thrown on or against them. Even a skilled and careful gardener using the ordinary cultivating tools cannot entirely prevent stones and clods of soil rolling onto and injuring tender plants, such as corn, beans, onions, beets, etc., usually sown or planted in rows; and he must frequently stop to uncover or straighten such an injured plant if it is not broken or totally destroyed.

One object of the invention is to provide a hand tool of the cultivator rake type with means which will effectively screen or guard the plants from such injury while the soil is being loosened or worked on either or both sides of a row of young plants of any kind.

Another object of the invention is to provide a hand tool of this character which will not only fend or guard the plants from injury by stones or clods rolling upon them but will cause fine soil to be sifted and thrown towards and about the plants, thereby promoting their growth.

Another object of the invention is to provide a hand tool of this character which will straddle a row of plants and cultivate the soil on both sides of the row and in which the parts may be variously adjusted according to the kind and size of the plants and to the nature of the soil manipulation that may be necessary or desirable.

A further object is to provide a straddle row, rake type, cultivating hand tool in which the parts may be so adjusted that the tool may not only be used substantially as an ordinary rake but may be used to prepare the soil for seeding and to form a shallow trench or groove for a row of seed.

With the above and other objects in view, the invention resides in the novel subject matter hereinafter described and claimed, description being accomplished by reference to the accompanying drawing.

Figure 1 is a perspective view of one embodiment of the invention showing a tool for working one side of a row of plants.

Fig. 2 is a perspective view of another form showing a tool for straddling a row of plants to cultivate both sides of the row simultaneously.

Fig. 3 is a plan view partly in section and on a reduced scale showing parts of the tool of Fig. 2 differently adjusted.

Fig. 4 is a plan view of another embodiment.

In Fig. 1 is shown a hand tool for cultivating one side of a row of plants. It comprises a rake or cultivator 1, a plant fender 2 and a handle 3 for supporting and manipulating the tool. Section 1 is preferably similar to an ordinary garden rake and comprises a head portion 4 with a series of downwardly projecting earth-working teeth 5, the teeth of said series being arranged in a straight row which extends transversely of the handle 3. While the plant fender section 2 may be of other forms, it preferably also comprises a head portion 6 with a series of downwardly projecting earth-working and screening teeth 7, the teeth of this series being arranged in a straight row extending rearwardly from one end of the row of teeth 5. It is desirable to make the head portions 4 and 6 of one piece of metal of L-shape, preferably right angular, with the two rows of teeth 5 and 7 extending along the two arms of the right angular head. The handle 3 is preferably of wood and fastened in a socket 8 suitably secured to the head portion 4 and projecting rearwardly therefrom at an angle.

In Figs. 2 and 3, there is shown a similar tool to straddle a row of plants and cultivate the soil on both sides thereof simultaneously. It embodies two lateral head sections 9 and 10, a central head section 11 and a handle 3ª. The head sections 9 and 10 are the same as the right-angular head shown in Fig. 1 with the handle socket 8 omitted, and means are provided for securing said head sections 9 and 10 to the central section 11. While the latter may be flat or straight, it is preferably upwardly arched as shown at 12 to permit of the cultivation of taller plants than would be possible without the arch. At the center of the arch may be formed a socket 8ª in which the handle 3ª is suitably secured.

The two head sections 9 and 10 may be rigidly and non-adjustably secured to the central head section 11 as shown in Fig. 4 or they may be adjustably mounted as shown in Figs. 2 and 3. In either case, the lower ends of the arched section 11 are formed with oppositely projecting arms 13ª adapted to lie upon the tops of the head sections 9 and 10. In Fig. 4, these arms are short and are riveted, bolted or otherwise fastened to said sections 9 and 10 as shown at 14. When the two sections 9 and 10 are thus permanently fastened to the central section 11, the rake head portions 4ª are in longitudinal alinement and the fender head portions 6ª are parallel and spaced from each other as shown.

In some cases, it may be preferable to mount the sections 9 and 10 on the central section 11 so that they may be adjusted toward and from each other and also angularly with respect to each other as shown in Figs. 2 and 3. In such case, the arms 13ª are made longer and formed with longitudinally extending slots 15 to receive bolts 14ª that have wing-nuts 16 on their threaded upper ends. The lower ends of bolts 14ª are fixed in the head sections 9 and 10 so that the bolts may have rotary and sliding movements in slots 15 when the nuts are loose. After the desired adjustment of the head sections 9 and 10 with respect to each other according to the size of the plants and the kind of cultivation of the soil desired, the nuts are tightened to rigidly fasten said head sections 9 and 10 to the central section 11. It will be seen that such adjustment will permit the rows of rake teeth 5ª to be angled with respect to each other to throw the soil to a greater or lesser degree toward the plants in the row being cultivated as the tool is drawn or moved rearwardly or toward the user. At the same time, the fender teeth 7ª will screen the moving soil adjacent the plants and prevent stones, clods of soil, trash, etc., from rolling onto and injuring the plants.

When the two head sections 9 and 10 are fixed to the central section 11 in the relation shown in Fig. 3, the two fender heads are in contact and their rows of teeth 7ª will be close to each other, while the rake or cultivator teeth 5ª of the two rows will form a single straight row. With the parts so adjusted, the tool may be used substantially like an ordinary garden rake. Such positioning of the parts also permits the tool to be used for preparing the soil for seeding since when the tool is drawn over the ground in a straight line, the two closely spaced rows of teeth 7ª will form a shallow trench to receive a row of seed.

It is believed that from the foregoing, the many uses and advantages of the invention will be readily understood. The tool whether of the single or double type, will effectively screen clods, stones, etc., away from the plants while permitting fine soil to be heaped against them to promote their growth. The tool thus makes cultivation much quicker and better with less care, skill and effort.

While excellent results are attainable from the details shown and described, variations may be made within the scope of the invention as claimed.

What is claimed is:

1. A straddle-row garden rake comprising a central head section consisting of an elongated bar having its intermediate portion arched to extend transversely over a row of plants, the ends of said bar being disposed substantially in horizontal alinement with each other; a central forwardly declined handle having its front end secured to said central head section; a first one-piece L-shaped head section disposed in a horizontal plane under one of said bar ends, one arm of said first L-shaped section being substantially unidirectional with said one end of said bar and projecting outwardly beyond the same, the other arm of said first L-shaped section being extended rearwardly toward the user from the inner end of said one arm; a second one-piece L-shaped head section disposed in a horizontal plane under the other of said bar ends, one arm of said second L-shaped section being substantially unidirectional with said other bar end and projecting outwardly beyond the same, the other arm of said second L-shaped section being extended rearwardly toward the user from the inner end of said one arm of this section; the first mentioned arms of said L-shaped sections being each provided with rake teeth disposed in a row extending from end to end thereof; the rearwardly extending arms of said L-shaped head sections being spaced apart and being each provided with rake teeth disposed in a row extending from end to end thereof; and means securing said L-shaped head sections against the lower sides of said bar ends respectively.

2. A straddle-row garden rake comprising a central head section consisting of an elongated bar having its intermediate portion arched to extend transversely over a row of plants, the ends of said bar being disposed substantially in horizontal alinement with each other; a central forwardly declined handle having its front end secured to said central head section; a first one-piece L-shaped head section disposed in a horizontal plane under one of said bar ends, one arm of said first L-shaped section being substantially unidirectional with said one end of said bar and projecting outwardly beyond the same, the other arm of said first L-shaped section being extended rearwardly toward the user from the inner end of said one arm; a second one-piece L-shaped head section disposed in a horizontal plane under the other of said bar ends, one arm of said second L-shaped section being substantially unidirectional with said other bar end and projecting outwardly beyond the same, the other arm of said second L-shaped section being extended rearwardly toward the user from the inner end of said one arm of this section; the first mentioned arms of said L-shaped sections being each provided with rake teeth disposed in a row extending from end to end thereof; the rearwardly extending arms of said L-shaped head sections being spaced apart and being each provided with rake teeth disposed in a row extending from end to end thereof; said bar ends each having a longitudinal slot, and combined pivot and clamping bolts extending vertically through these slots and through said L-shaped head sections to permit relative adjustments of these head sections and to then secure them to said central head section, said slots being sufficiently long to permit inward adjustment of said L-shaped head sections to positions in which their rearwardly extending arms will abut each other.

CARL T. STORM.
LOUISE H. STORM.

REFERENCES CITED

The following references are of record in the file of this patent:

UNITED STATES PATENTS

| Number | Name | Date |
|---|---|---|
| 90,691 | Senour | June 1, 1869 |
| 92,772 | Ahearn | July 20, 1869 |
| 143,354 | Jones | Sept. 30, 1873 |
| 322,524 | Cramer | July 21, 1885 |
| 381,169 | Rhodes | Apr. 17, 1888 |
| 387,333 | Allen | Aug. 7, 1888 |
| 442,518 | Evans et al | Dec. 9, 1890 |
| 467,149 | Bruner | Jan. 19, 1892 |
| 556,389 | Wheeler | Mar. 17, 1896 |
| 678,519 | Robinson | July 16, 1901 |
| 705,233 | Hartell | July 22, 1902 |
| 753,830 | Lemm | Mar. 1, 1904 |
| 1,120,062 | Krabill | Dec. 8, 1914 |
| 1,413,127 | Matthews | Apr. 18, 1922 |
| 1,478,298 | Ruediger | Dec. 18, 1923 |